US011383647B2

(12) United States Patent
Stinner et al.

(10) Patent No.: US 11,383,647 B2
(45) Date of Patent: Jul. 12, 2022

(54) EARTH WORKING MACHINE HAVING A CLIMBING DEVICE THAT IS VARIABLE IN LENGTH AND HAS A PLURALITY OF DIFFERENT CLIMB-READY OPERATING POSITIONS

(71) Applicant: Wirtgen GmbH, Windhagen (DE)

(72) Inventors: Tobias Stinner, Nister (DE); Christian Berning, Zülpich (DE); Philipp Prassel, Neustadt/Wied (DE)

(73) Assignee: Wirtgen GmbH

( * ) Notice: Subject to any disclaimer, the term of this patent is extended or adjusted under 35 U.S.C. 154(b) by 0 days.

(21) Appl. No.: 17/345,343

(22) Filed: Jun. 11, 2021

(65) Prior Publication Data

US 2021/0402930 A1    Dec. 30, 2021

(30) Foreign Application Priority Data

Jun. 30, 2020    (DE) .................... 10 2020 117 251.6

(51) Int. Cl.
*B60R 3/02*     (2006.01)
*E02F 9/08*     (2006.01)

(52) U.S. Cl.
CPC .............. *B60R 3/02* (2013.01); *E02F 9/0833* (2013.01)

(58) Field of Classification Search
CPC ................................. B60R 3/02; E02F 9/0833
See application file for complete search history.

(56) References Cited

U.S. PATENT DOCUMENTS 2,485,413 A    10/1949    Ross
3,061,042 A    10/1962    Giles
(Continued)

FOREIGN PATENT DOCUMENTS

DE    102014010488 A1 *    1/2016    .......... E01C 23/088
DE    102014010488 A1       1/2016
(Continued)

OTHER PUBLICATIONS

German Office Action for corresponding patent application No. DE 102020117251.6, dated Apr. 8, 2022, 8 pages (not prior art).
(Continued)

*Primary Examiner* — Jacob B Meyer
(74) *Attorney, Agent, or Firm* — Lucian Wayne Beavers; Patterson Intellectual Property Law, PC (57) ABSTRACT

The present invention relates to a self-propelled earth working machine (10) comprising
  a machine frame (14),
  a traveling gear (16) supporting the machine frame (14),
  a working apparatus (30), which is designed for working a subsoil,
  a driving force machine (46) for providing driving force for the earth working machine (10),
  an operator platform (28) situated on the machine frame (14) at an elevation level above the contact subsurface (U), and
  a climbing device (48) situated between the contact subsurface (U) and the operator platform (28), which has a plurality of step treads (54, 56, 58, 60), which are situated in succession along a virtual climbing axis (SA),
the climbing device (48) being variable in length along the climbing axis (SA) and for this purpose at least one of the step treads (54, 56, 58, 60) being adjustable relative to at least one other of the step treads (54, 56, 58, 60) with the aid of an adjustment actuator (76). The invention provides for the climbing device (48) to be adjustable into at least three different climb-ready operating positions, it being the case that for each step tread pair (54/56, 56/58, 58/60) formed by two of at least three step treads (54, 56, 58, 60) situated in succession along the climbing axis (SA) that the distance between the step treads (54, 56, 58, 60) of the respective step (Continued)

tread pair (54/56, 56/58, 58/60) is of a different magnitude in different operating positions.

20 Claims, 5 Drawing Sheets

(56) References Cited

U.S. PATENT DOCUMENTS

| | | | | |
|---|---|---|---|---|
| 5,848,870 | A | * | 12/1998 | Smith ..................... B60P 1/02 296/26.05 |
| 9,539,948 | B1 | | 1/2017 | Presley et al. |
| 9,994,159 | B2 | | 6/2018 | Giesmann |
| 10,036,201 | B1 | | 7/2018 | Haro et al. |
| 10,246,940 | B1 | * | 4/2019 | Haro ..................... E06C 7/02 |
| 2017/0246992 | A1 | | 8/2017 | Giesmann |
| 2021/0101534 | A1 | * | 4/2021 | Aswani ..................... E06C 5/44 |
| 2021/0402930 | A1 | * | 12/2021 | Stinner ................. E02F 9/0833 |

FOREIGN PATENT DOCUMENTS

| | | | | |
|---|---|---|---|---|
| DE | 102017202974 | A1 | | 8/2017 |
| DE | 102018128296 | A1 | | 5/2019 |
| DE | 102020212064 | A1 * | 4/2021 | ............... B60R 3/02 |
| JP | 10273956 | A | | 10/1998 |
| JP | 2008240278 | A * | 10/2008 | ............ E02F 9/0833 |
| WO | WO-2015051409 | A1 * | 4/2015 | ............... B60R 3/02 |

OTHER PUBLICATIONS

European Patent Office Search Report for corresponding patent application No. 21181280.5, dated Dec. 3, 2021, 5 pages (not prior art).

* cited by examiner

EARTH WORKING MACHINE HAVING A CLIMBING DEVICE THAT IS VARIABLE IN LENGTH AND HAS A PLURALITY OF DIFFERENT CLIMB-READY OPERATING POSITIONS

BACKGROUND OF THE INVENTION

1. Field of the Invention

The present invention relates to a self-propelled earth working machine comprising
 a machine frame,
 a traveling gear supporting the machine frame, the traveling gear comprising at least two drive units rollable on a contact subsurface of the earth working machine,
 a working apparatus, which is designed for working a subsoil,
 a driving force machine for providing a driving force for the earth working machine,
 an operator platform for operating the earth working machine, which is situated on the machine frame at an elevation level at a distance above the contact subsurface, and
 a climbing device situated between the contact subsurface and the operator platform, which has a plurality of step treads, which are situated in succession along a virtual climbing axis extending between the contact subsurface and the elevation level of the operator platform and enclosing an angle together with the contact subsurface,
 the climbing device being variable in length along the climbing axis and for this purpose at least one of the step treads being adjustable relative to at least one other of the step treads with the aid of an adjustment actuator.

Description of the Prior Art

An earth working machine in the form of a small road cold milling machine or small road milling machine having a milling drum situated in the rear section as working apparatus is known from DE 10 2014 010 488 A1. This document discloses a small milling machine whose climbing device is adjustable between a so-called "climbing position", in which a machine operator is able to move from the contact subsurface up to the operator platform and back, and a so-called "stow position" distinct from the climbing position. In the stow position, the climbing device is to be removed at least in the lower rear section of the small milling machine, in order to shorten the longitudinal dimension of the small milling machine in its lower region directly above the contact subsurface and thus be able to make more effective use of the transport capacity of a flat-bed truck transporting the small milling machine. Thus, due to the space freed by the adjustment of the climbing device into the stow position, the flatbed truck is to be able to transport, not only the small milling machine, but additionally a passenger car. The front of the passenger car is to be able to be accommodated in the transport space below the climbing device, which has been cleared by moving the climbing device into the stow position.

Another climbing device of a small milling machine is known from DE 10 2018 128 296 A1 (U.S. Pat. No. 10,036,201). This climbing device having altogether three step treads has an uppermost step tread fixed to the machine frame and a step tread assembly comprising the middle and lowest step tread, it being possible to displace the step tread assembly against the preload force of a spring assembly away from the uppermost step tread toward the contact subsurface and to lock it in the displaced position. The displacement against the preload force of the spring assembly occurs by the weight of the machine operator when the machine operator puts load on a step tread of the step tread assembly.

In both known climbing devices, the lowest step tread is connected to the step treads situated above it via side plates made of elastomer material so that the lowest step tread is able to move passively out of the way in the event of collisions with ground material.

A disadvantage in both of the known approaches is that these approaches each have precisely only one climb-ready operating position for a climbing movement of the machine operator between the operator platform and the contact subsurface—in either direction.

This climb-ready operating position may be unergonomic in particular cases, for example if the machine operator has an unusual body height deviating from the average height of an adult and/or if the operator platform, as in the small milling machines of the above-mentioned related art, is height-adjustable, that is, if it is capable of being raised and lowered relative to the contact subsurface, and is at a vertical position that is disadvantageous for ascending or descending.

SUMMARY OF THE INVENTION

It is therefore the objective of the present invention to develop the earth working machine mentioned at the outset further in such a way that it allows for an improved adaptation of the climbing device to the physiognomy of an adult working on the operator platform and/or to a current operating position of the operator platform.

The present invention achieves this objective by an earth working machine of the kind mentioned at the outset, in which the climbing device is adjustable in at least three different climb-ready operating positions for a climbing movement of a machine operator between the operator platform and the contact subsurface, it being the case that for each step tread pair formed from two of at least three successive step treads along the climbing axis, the distance between the step treads of the respective step tread pair is of different magnitude in different climb-ready operating positions.

The climbing axis is preferably a rectilinear climbing axis. It shall not be precluded, however, that the climbing axis is a curved climbing axis, it then preferably being curved about a curvature axis that is parallel to the preferably mutually parallel step tread longitudinal extension directions.

The development of the climbing device such that it is adjustable in at least three climb-ready operating positions, each of which allows for ascending from the contact subsurface to the operating platform and for descending in the opposite direction, makes it possible for the climbing device to be adapted at least along general lines substantially better to the respective climbing situation than in the related art. Thus, it is possible to adapt the climbing device to small, medium and large body heights and/or to a small, medium and large distance of the operator platform from the contact subsurface.

Since the individual distances between the at least three step treads change from operating position to operating position of the climbing device, an adaptation of the climbing device to the respective climbing situation occurs not only between two adjacent step treads, but rather across at least three step treads. Thus, it is possible to apportion the change in length of the climbing device between two operating positions to at least two partial changes in length between multiple step treads, at least once between an upper step tread located remotely from the contact subsurface and a middle step tread located more closely to the contact subsurface and another time between the middle step tread and a lower step tread located even more closely to the contact subsurface. This allows for more uniform dimensions of the individual distances and consequently results overall in a more ergonomic and less hazardous climbing device.

The earth working machine may be for example a road milling machine, a recycler, a surface miner, a road paver or a compactor, to mention only a few possibilities. The earth working machine is preferably a road milling machine, in particular a small milling machine or compact milling machine having a removal tool situated in the rear section of the earth working machine, which is designed for removing ground material starting from the ground surface.

In the present application, unless stated otherwise in a particular instance, the earth working machine is described as standing on a level, horizontal contact subsurface.

In the present application, "traveling gear" refers to the totality of all drive units, that is, the totality of all individual rollable contact assemblies, by which the earth working machine makes tread contact with the contact subsurface. A drive unit may comprise a revolving track as a tracked or crawler-type drive unit or a rotatable wheel as a wheel drive unit, in order to be able to roll.

The working apparatus may be any working apparatus that is designed to modify a ground surface or, starting from the existing ground surface, to modify a volume section of the ground. The working apparatus may therefore be a surface-texturing device, a material-removing device or a material-applying device or a device performing a combination of the aforementioned functions. On the basis of the aforementioned preferred embodiment of the present earth working machine, the working apparatus preferably comprises a milling drum comprising a milling drum tube, on the outside surface of which a plurality of milling bits is situated, preferably interchangeably, in bit holders or bit exchange holders.

The driving force machine may be any machine for converting a form of energy into another form of energy that is usable as a driving force. The driving force provided by the driving force machine may be used for achieving propulsion for a movement of the earth working machine and/or as a driving force of the working apparatus. The driving force machine preferably provides both the driving force for the propulsion of the earth working machine as well as the driving force for the working apparatus. In a proven as well as preferred specific embodiment, the driving force machine provides by way of a drive shaft a takeoff point for kinetic energy, which is multiplied preferably by a transfer gear connected to the drive shaft, comprising a main output and at least one auxiliary output. On an output composed of main output and auxiliary output, it is furthermore possible to provide kinetic energy in the form of a rotating transfer gear output shaft. A hydraulic pump may be connected to at least one other output in order to provide, on board of the earth working machine, hydraulic oil at an elevated pressure level as an energy store for hydraulic motors. Additionally, or alternatively, a generator for generating electrical energy may be connected to an output.

Due to the high energy storage density of hydrocarbon-based fuels, the driving force machine is preferably an internal combustion engine, particularly preferably a diesel engine.

The climbing axis may fundamentally enclose a right angle together with the contact subsurface. Due to the resulting improved ergonomics when ascending and descending, the virtual climbing axis is inclined away from a person standing ready to ascend on the contact subsurface in front of the climbing device, that is, facing the climbing device, so that step treads succeeding one another in the vertical direction from the contact subsurface are situated offset to one another both orthogonally to the vertical direction as well as orthogonally to a step tread longitudinal extension direction that normally runs parallel to the contact subsurface. The step tread longitudinal extension direction is the direction in which the step treads have their greatest dimension. The offset is here preferably such that the distance between a step tread and the person standing ready to climb on the contact subsurface in front of the climbing device increases with increasing distance of the step tread from the contact subsurface. The inclination of the climbing axis relative to the normal on the contact subsurface is preferably between 4° and 10°, particularly preferably between 5° and 8°.

With the aforementioned three distinct operating positions, it is possible to perform the rough subdivision, likewise mentioned above, into three classes of climbing situations and the adaptation of the earth working machine to the three classes. A substantially better differentiation is thus achieved than hitherto in the related art, according to which the climbing device is either in an operating state climb-ready for ascending or descending or in a stowed state in which it is not ready for climbing. Another improvement of the adaptability of the presently discussed earth working machine to numerous different operating situations of the earth working machine may be achieved in that the climbing device is adjustable within its adjustment range steplessly into a multitude of different climb-ready operating positions for ascending and descending between the operator platform and the contact subsurface. This is possible for example by using a steplessly adjustable adjustment actuator for adjusting the climbing device.

The advantage of a climbing device that is adaptable to different climbing situations is particularly useful if the self-propelled earth working machine comprises a lifting device, by which the machine frame is connected in height-adjustable fashion to the traveling gear, the lifting device being designed to change the distance of the machine frame relative to the traveling gear. For in that case, the change of a vertical distance of the machine frame from the traveling gear normally also changes the distance of the operator platform from the contact subsurface.

The lifting device preferably comprises lifting columns variable in length, which connect the individual drive units with the machine frame. Particularly preferably, the individual lifting columns are variable in length by way of hydraulic piston-cylinder assemblages. As described above, the hydraulic energy may be provided by hydraulic pumps, which are drivable by the driving force machine.

Since the climbing device is to be adjustable primarily with the aim of bridging the variable distance between the elevation level of the operator platform and the section of the contact subsurface from which a person climbs onto the operator platform or to which a person descends from the operator platform, it is advantageous for achieving an assemblage of the climbing device that is as simple, quick and correct as possible if the adjustment actuator is designed to be operated in automated fashion according to a reference to the contact subsurface such that a predefined step tread that is movable relative to the machine frame is situated in a predefined spatial region relative to the machine frame and/or relative to the contact subsurface.

Since this aspect of an automated adjustability of the climbing device does not depend on the number of three climb-ready operating positions, but is achievable also with two, in particular climb-ready, operating positions, the present invention also relates to a self-propelled earth working machine comprising a machine frame,
a traveling gear supporting the machine frame, the traveling gear comprising at least two drive units rollable on a contact subsurface of the earth working machine,
a working apparatus, which is designed for working a subsoil,
a driving force machine for providing a driving force for the earth working machine,
an operator platform for operating the earth working machine, which is situated on the machine frame at an elevation level at a distance above the contact subsurface, and
a climbing device situated between the contact subsurface and the operator platform, which has a plurality of step treads, which are situated in succession along a virtual climbing axis extending between the contact subsurface and the elevation level of the operator platform and enclosing an angle together with the contact subsurface,
the climbing device being variable in length along the climbing axis and for this purpose at least one of the step treads being adjustable relative to at least one other of the step treads with the aid of an adjustment actuator, the climbing device being characterized by the fact that the adjustment actuator is designed to be operated in automated fashion according to a reference to the contact surface such that a predetermined step tread movable relative to the machine frame is situated in a predetermined spatial region relative to the machine frame and/or relative to the contact subsurface.

Advantageous developments described in the present application of the earth working machine mentioned at the outset are also advantageous developments of the earth working machine mentioned in the preceding paragraph.

Since for an ergonomic use of the climbing device for ascending and/or descending, the distance of a predetermined step tread, preferably the lower step tread, from the contact subsurface is of primary importance, the reference to the contact subsurface preferably represents a vertical distance of the predetermined step from the contact subsurface.

The reference to the contact subsurface may be a mechanical reference, for example a physical connection of the predetermined step tread to a component, which has a fixed spatial correlation with the contact subsurface when the earth working machine is in operation. Such a component may be a drive unit, for example, or a console of a lifting column of the lifting device connected to the drive unit for joint movement.

The reference to the contact subsurface may additionally or alternatively be a sensory reference, for example a signal, which represents a detection value of a sensor or of multiple sensors, the detection value comprising information about the relative position, in particular the vertical distance, of the predetermined step tread from the contact subsurface. Such a sensory reference may be a direct sensor reference, for example on the basis of a detection signal of a sensor detecting the distance from the contact subsurface, which sensor is situated either in a fixed position relative to the predetermined step tread at least with respect to its vertical position or is situated relative to the predetermined step tread in such a way that its vertical distance from the contact subsurface relative to the vertical distance of the predetermined step tread from the contact subsurface changes in accordance with a known predetermined regularity.

Thus, according to the present application, any distance information containing a distance value comprises information about the vertical distance of the predetermined step tread from the contact subsurface, whose distance value may be converted merely by addition of a predetermined summand and/or by multiplication with a predetermined factor into the vertical distance value of the predetermined step tread from the contact subsurface. This means for example that even if a sensor does not detect the vertical distance of the predetermined step tread from the contact subsurface directly, but rather detects a distance between itself and the contact subsurface, its detection signal contains information about the vertical distance of the predetermined step tread from the contact subsurface due to the fixed positional relation at least of the sensor vertical position to the vertical position of the predetermined step tread.

Such a sensory reference may also be a sensory chain reference, according to which the detection signals of multiple sensors are taken into account, none of which directly detect the relative position between the contact subsurface on the one hand and the predetermined step tread or the sensor itself on the other hand, if the cumulative consideration of the multiple sensor signals contains information about the vertical distance between the predetermined step tread and the contact subsurface. For example, a first sensor may detect a relative position of the machine frame relative to the traveling gear standing on the contact subsurface and another sensor may detect a relative position of the predetermined step tread relative to the machine frame. Then it is possible to obtain from a cumulative consideration of the two sensor signals information about the relative position of the predetermined step tread relative to the contact subsurface.

Since, if a lifting device is present, the lifting device substantially influences the height to be overcome by the climbing device between the contact subsurface and the operator platform, it is advantageous for the optimal adaptation of the climbing device to the respective climbing situation, if the climbing device is adjustable into a climb-ready operating position in accordance with a working state or a working position of the lifting device. A working position of the lifting device is determined by the relative disposition of components of the lifting device that are movable relative to one another. The working position may be determined by the movement of the lifting device during a change of the distance between the machine frame and the traveling gear. For the adjustability of the climbing device in accordance with the working state or the working position of the lifting device there are at least two concrete technical approaches, which are explained in more detail further below.

For facilitating the construction of the climbing device, an upper of the at least three step treads more distant from the contact subsurface may be fixed in position on the machine frame. Thus, it is not necessary for all step treads to be situated in movable fashion with respect to the machine frame. A machine-fixated step tread may also be the platform of the operator platform itself. If climbing device comprises k step treads, k being an integral number greater than or equal to 3, it consequently suffices if at most k−1 step treads are respectively situated in movable fashion both relative to one another as well as relative to a step tread that is fixed to the machine frame.

A first structural development option for providing the climbing device as adjustable to a climb-ready operating position in accordance with a working state or a working position of the lifting device is to couple a step tread, preferably the lower of the at least three step treads located closer to the contact subsurface, by way of a connection means to a drive unit-side coupling component that is fixed in terms of height relative to the contact subsurface. This coupling or the drive unit-side coupling component is a mechanical or physical reference, as was explained above. The step tread coupled to the drive unit-side coupling component is then the predetermined step tread mentioned above in connection with the explanation of the reference to the contact subsurface.

The drive unit-side coupling component may be a section of the drive unit itself or may comprise a component connected to the drive unit for joint vertical displacement. The drive unit itself has, for example as a crawler track unit, a rotation body on which a track is supported so as to be able to rotate. Although it is fundamentally possible, it is not advantageous due to the resulting load, to use the rotation body directly as the drive unit-side coupling component or to connect it to such a coupling component.

The aforementioned lifting device normally has at its end that is closer to the traveling gear a console assembly that is connected to the traveling gear for joint vertical displacement. This means that in the aforementioned preferred specific embodiment each lifting column of the lifting device has at its end closer to the drive unit respectively one console connecting the lifting column to the drive unit. The console is normally tiltable relative to the drive unit about a tilting axis that is parallel to the contact subsurface in order to enable the drive unit to drive over uneven ground without thereby transmitting flexural torques onto the lifting device, in particular onto the lifting column respectively directly associated with the drive unit. The console, which preferably spans the drive unit in a fork-like manner in the form of an upside-down U, offers sufficient installation space and may be designed to be sufficiently stable in order to use it as the drive unit-side coupling component.

By coupling the step tread, preferably the lower step tread, to the drive unit-side coupling component it is possible to ensure that the lower step tread permanently has a fixed spatial association with the drive unit standing on the contact subsurface along a vertical axis that is orthogonal to the contact subsurface. This vertical axis is parallel to the yaw axis of the self-driving earth working machine. For this reason, the lower step tread is preferably the step tread coupled to the drive unit-side coupling component, since of all step treads it has the greatest relative movement travel relative to the machine frame.

The fixed spatial association may be a rigid association so that the lower step tread is immobile in the vertical direction relative to the drive unit-side coupling component. It may be more advantageous, however, for example with a view to locking processes of the climbing device described further below or with a view to a certain play in the adaptation of the climbing device to a specified climbing situation that the lower step tread is coupled to the drive unit-side coupling component with a clearance of motion. The clearance of motion advantageously has a degree of freedom of motion along the climbing axis. The fixed spatial association is then such that for the duration of the coupling the lower step tread is unable to leave a predetermined range of motion along both the climbing axis as well as the vertical axis relative to the drive unit-side coupling component.

For repair or maintenance purposes or also for special operating situations of the earth working machine it may be advantageous if the coupling of the lower step to the drive unit-side coupling component is releasable and restorable.

In an advantageously simple structural development, the clearance of motion between the lower step tread and the drive unit-side coupling component may be implemented in such a way that the lower step tread is coupled to the drive unit-side coupling component by way of a traction means transmitting only tractive force, such as a chain, a rope or a belt, as the connection means. The lower step tread or a step tread assembly having multiple step treads, including the lower step tread, which is movable relative to a step tread fixed to the machine, is able to tauten the traction means by its weight, it being possible for the lower step tread or the step tread assembly to be lifted a predetermined distance counter to its weight, without the traction means impeding or preventing the lift. The step tread assembly may comprise a plurality of, or all, step treads that are not fixed to the machine frame, it being possible for the step treads of the step tread assembly to be movable relative to one another along the climbing axis and preferably being movable along the climbing axis.

When lifting the machine frame, the step tread assembly maintained by the connection means at a vertical position or in a vertical range relative to the drive unit-side coupling component remains loaded by the weight of the step tread assembly so that the machine frame, possibly together with an upper step tread fixed to the machine frame, may be lifted relative to a lowermost step tread of the step tread assembly supported on the machine frame so as to be displaceable along the climbing axis. Advantageously, the support of the step tread assembly on the machine frame is of such easy motion that the weight of the step tread assembly suffices to effect a relative movement between the step tread assembly and the machine frame. When lowering the machine frame, the step tread assembly is limited in its movement toward the contact subsurface by the traction means so that when the machine frame is lowered there is an approach movement of the machine frame, in particular of an upper step tread fixed to the machine frame, relative to a lowermost step tread of the step tread assembly.

The clearance of motion of the lower step tread with a degree of freedom of motion along the climbing axis relative to the contact subsurface may be further increased in magnitude in that the drive unit-side coupling component has a coupling configuration, to which the connection means is connected, the coupling configuration being movable relative to the drive unit or relative to the remaining drive unit-side coupling component with a movement component along the climbing axis. For example, the coupling configuration may comprise a projection or a clearance, in particular a through hole, or an eyelet, on which the connection means is or may be secured, the coupling configuration being movable, preferably swiveling, relative to the remaining drive unit-side coupling component. The coupling configuration is preferably able to swivel relative to the remaining drive unit-side coupling component about a swivel axis that is parallel to contact subsurface so that the coupling configuration by way of a predetermined swivel motion is able to traverse the greatest possible vertical distance along the climbing axis. Of course, the coupling configuration may also be movable in translatory fashion relative to the remaining drive unit-side coupling component, a translatory mobility, however, normally requiring a more elaborate movement guidance than the previously described swivel mobility and therefore being less preferred.

If the lower of the at least three step treads, which is movable relative to the machine frame, is coupled to the drive unit-side coupling component, a vertical displacement of the machine frame relative to the traveling gear may be used directly for changing the length of the climbing device. This is a concrete option for effecting the change in length of the climbing device and thus the adjustment of the climbing device into an operating state climb-ready for ascending and descending in accordance with a working state or a working position of the lifting device.

Due to the linkage of a lifting movement of the machine frame relative to the traveling gear with an adjustment movement of the climbing device relative to the machine frame, the lifting device may then preferably be the adjustment actuator of the climbing device. Thus, no separate adjustment actuator for adjusting the climbing device is required beyond the lifting device that is provided anyway in certain kinds of earth working machines.

In order to provide the most advantageous ergonomics possible of the variable-length climbing device in at least a majority of its operating states, the present invention provides for an upper of the at least three step treads located further away from the contact subsurface and a lower of the at least three step treads located closer to the contact subsurface to be coupled kinematically to each other via a movement synchronization mechanism in such a way that the step tread distances between respectively two directly adjacent step treads succeeding one another along the climbing axis in a plurality of different operating states differ, relative to the greatest distance, by no more than 10%. The upper step tread may be fixed to the machine. The lower step tread is preferably the aforementioned lower step tread coupled to the drive unit-side coupling component.

Thus, it is possible for distances between step treads succeeding one another along the climbing axis to have nearly the same dimensions, which supports the ergonomics and the comfort when using the climbing device. The distances succeeding one another along the climbing axis between respectively two step treads preferably differ by no more than 5%, the distances particularly preferably being identical.

Preferably, a step tread is coupled for movement directly to the adjustment actuator without interposing another step tread as lead step tread. It is possible, but not necessary, for this coupling to define a transmission ratio differing from "1", by which the movement of the adjustment actuator is transmitted to the lead step tread. Due to the movement synchronization mechanism, the movements of further step treads that are movable relative to the machine frame are derived from the movement of the lead step. For example, if a step tread, as described above, is coupled to the drive unit-side coupling component and therefore the lifting device forms the adjustment actuator, then the step tread coupled to the drive unit-side coupling component is the lead step tread, that is, preferably the lower, particularly preferably the lowermost of the at least three step treads.

Movement synchronization mechanisms, which allow for a movement of multiple components along an axis of motion having pairwise identical component spacings along the axis of movement, are known for example from telescopic component assemblages. Fundamentally, the climbing device of the presently discussed earth working machine may also have a telescopic mechanism such that for at least two of the at least three step treads it is the case that one step tread is guided for movement along the climbing axis on a step tread structure directly adjacent to it along the climbing axis. In this context, a step tread structure may comprise a step tread and at least one lateral component supporting the step tread. Preferably, a step tread structure comprises a step tread and two lateral components supporting the step tread at a distance from each other. For example, a first step tread structure movable relative to the machine frame, which has a first movable step tread, may be movably supported on the machine frame along the climbing axis. A second step tread structure, which has a second movable step tread, which follows upon the first movable step tread along the climbing axis, may be movably supported on the first movable step tread structure along the climbing axis. If the climbing device has only two movable step treads, then the second movable step tread may be the lowermost step tread. Otherwise, a third step tread structure with a third movable step tread, in a continuation of the sequence arrangement described above, may be movably supported on the second step tread structure along the climbing axis, the second movable step tread being situated along the climbing axis between the first and the third movable step tread, and so forth.

In contrast to a telescopic construction of the climbing device described above, a slimmer construction is preferred, according to which a guide step tread movable relative to the machine frame, that is preferably the lead step tread, is movably supported on the machine frame by a guide linkage system, at least two further step treads, which are movable relative to the machine frame and relative to the guide step tread, being supported directly on and movably relative to the guide linkage system. The guide linkage system may comprise two parallel rails, between which the step treads extend by bridging the distance between the rails.

The movement synchronization mechanism may comprise for example a cascade of blocks and tackles. For this purpose, each step tread structure may be coupled rigidly to a block of the block and tackle cascade, each block deflecting a rope exactly once, which is at one end fixed to the machine frame and at the other end connected fixedly to the block of a directly following step tread structure along the climbing axis. For k involved step treads, it is possible to achieve a kinematic spread of the involved step treads from one another in such a way that the travel distance of the step tread at one end of the block and tackle cascade amounts to only the $2^{-k}$-fold or the $2^k$-th fraction of the travel distance of the step tread at the other end of the block and tackle cascade. Preferably, the lowermost step tread is the one having the $2^{-k}$-fold travel distance and the step tread furthest removed from the contact subsurface is the step tread specifying the travel distance. The "block" of the step tread fixed to the machine frame is itself fixed to the machine frame and may thus be formed merely by a deflection pulley.

Alternatively, or additionally, the movement synchronization mechanism may comprise a scissor gear, as is known from scissor lift tools. Such a scissor gear has a plurality of gear scissors, which respectively have two scissor links connected to each other in scissor-like and articulated fashion in their longitudinal center area by a scissor hinge. Each scissor link of a gear scissor is connected at its longitudinal end in articulated fashion to a scissor link of an adjacent gear scissor by a connecting hinge in such a way that in a relative rotation of two scissor links of the same gear scissor all scissor links of all connected gear scissors rotate relative to one another about their scissor hinge. When operating the scissor gear, it is thus possible to change uniformly the spacings of scissor links and/or connecting links succeeding one another in a gear scissor succession direction. If one couples the individual step treads movable relative to the machine frame for joint movement along the gear scissor succession direction to the scissor hinges and/or the connecting hinges, then these may be moved equidistantly toward one another or away from one another.

According to a possible further specific embodiment, the movement synchronization mechanism may comprise a transmission assemblage that is movable about an axis of motion that is orthogonal to the climbing axis, at least one portion of the step treads movable relative to the machine frame along the climbing axis respectively being connected to the transmission assemblage in movement-transmitting fashion in such a way that a movement of the transmission assemblage about the axis of motion correlates with an adjustment movement of the respective step tread along the climbing axis. The movement of the adjustment actuator is transmitted to the transmission assemblage and from there at a respectively different transmission ratio to each of a plurality of the step treads coupled to the transmission assemblage and movable relative to the machine frame along the climbing axis. In the preferred case of the use of the lifting device as the adjustment actuator of the climbing device, the lower step tread coupled to the drive unit-side coupling component is the lead step tread. Even when using an adjustment actuator provided separately from the lifting device, the lead step tread is preferably a step tread at the extreme along the climbing axis, for example the lower step tread, even if it is then not necessary for the latter to be coupled to a drive unit-side coupling component.

An adjustment movement of the adjustment actuator, in particular a lifting movement of the machine frame, then results in a relative movement between the machine frame, for example the upper step tread fixed to the machine frame and/or the operator platform, and the lead step tread, in particular the lower step tread coupled to the drive unit-side coupling component as the lead step tread. This actuator-induced relative movement is transmitted to the transmission assemblage, if necessary by using a movement step-up ratio or movement step-down ratio. By coupling the movement of the remaining step treads that are movable relative to the machine frame to the transmission assemblage, the relative movement of the lead step tread relative to the machine frame is transmitted by the movement of the transmission assemblage in accordance with a dimension characteristic for the respective movement coupling of the particular step tread to the respective further step tread that is movable relative to the machine frame. The characteristic dimension of the movement coupling of the individual step tread to the transmission assemblage thus determines a transmission ratio, at which the movement of the transmission assemblage is transmitted to the respective step tread. At least one portion of the step treads arranged along the climbing axis with increasing distance from the lead step tread is coupled to the transmission assemblage by using a respectively other characteristic dimension of the movement coupling. The axis of motion is preferably fixed to the machine frame.

In one specific embodiment, the transmission assemblage may comprise a swivel lever swivable about a swivel axle as the axis of motion or may be such a swivel lever. The aforementioned remaining step treads movable relative to the machine frame are linked on the swivel lever, for example by ropes, chains, belts or rods, the aforementioned characteristic dimension of the movement coupling being in the present specific embodiment the distance of the linkage location of a step tread on the swivel lever from the swivel axle of the swivel lever and thus the lever arm associated with this step tread.

For the aforementioned remaining step treads that are movable relative to the machine frame and are linked on the swivel lever it is the case that the order of the linkage locations of the step treads in the direction away from the swivel axle corresponds to the order to the step treads movable relative to the machine frame in the direction toward the contact subsurface. The length of the lever arm respectively effective for a step tread at the swivel lever increases with decreasing distance of the step tread from the contact subsurface.

Additionally, or alternatively, the transmission assemblage may comprise or be a rotation assembly rotatable about an axis of rotation as the axis of motion. The rotation assembly comprises a plurality of jointly turning rotation bodies of different diameters, at least one portion of the aforementioned remaining step treads that are movable relative to the machine frame being coupled respectively to one rotation body of another engagement circumference for joint movement, for example by ropes, chains, belts, in particular toothed belts or straps. At least a portion of the rotation bodies may therefore be developed as toothed wheels. In this case, the actuator-induced adjustment movement of the lead step tread may be transmitted via a suitable transmission means, such as a chain, in particular a roller chain, a toothed rack, a toothed belt, a friction rack, a friction belt, etc., to a lead rotation body, which is coupled to the remaining rotation bodies in a torsionally fixed manner and turns jointly with these at a common angular velocity about the axis of rotation. The transmission means may be situated for example along a lateral part on the lateral part, by way of which the lead step tread is supported on the machine frame in a manner that is displaceable relative to the machine frame. Since the lead step tread is usually situated between two lateral parts and spans the distance between the two lateral parts, respectively one transmission means may be situated on each lateral part for reasons of a preferred symmetrical application of force. The lead rotation body is preferably a toothed wheel on account of the form-locking force transmission, but it may also be a friction wheel.

The aforementioned characteristic dimension of the movement coupling is in the present specific embodiment the diameter dimension or circumferential dimension proportional to the diameter dimension of an engagement circumference of a rotation body.

Depending on the direction of rotation of the rotation assembly, the rotation body may wind up or wind off a connection means connecting the rotation body to the respective step tread and thereby change a distance of the respective step tread from the axis of rotation and consequently relative to the machine frame. Alternatively, the engagement circumference may be developed with a toothing and be in a meshing form-locking engagement with a counter-toothed configuration, such as for example a toothed belt, toothed rack or (roller) chain, which is fixed in place relative to the respectively coupled step tread, but is movable relative to the machine frame, and thus likewise change a distance of the respective step tread from the axis of rotation by turning. Different diameter dimensions of the rotation bodies or circumferential dimensions of the engagement circumferences result in an equidirectional, but quantitatively different relative movement of the step treads coupled to the rotation assembly along the climbing axis.

In the preferred case of the use of the lifting device as the adjustment actuator of the climbing device, it is the case that for the remaining aforementioned step treads, which are coupled to the rotation assembly, but are movable relative to the machine frame, the diameter of the engagement circumference of a rotation body coupled to a step tread decreases with increasing distance of the step tread from the contact subsurface. The order of the step treads coupled to rotation bodies of increasing engagement circumferences matches the order of the arrangement of the step treads in the direction of the contact subsurface.

The movement synchronization mechanism may be formed from only one of the aforementioned exemplary embodiments or may comprise a mixed form of the aforementioned exemplary embodiments, depending on the installation space circumstances and kinematic requirements of the particular case.

As an alternative to the use of the lifting device as an adjustment actuator, the adjustment actuator may be an adjustment actuator developed separately from the lifting device.

For developing the adjustment actuator to be operated in automated fashion in accordance with a reference to the contact subsurface in such a way that a predetermined step tread, which is movable relative to the machine frame, is situated in a predetermined spatial region relative to the machine frame and/or relative to the contact subsurface, the earth working machine may have a distance sensor, which detects a vertical distance of the predetermined step tread from the contact subsurface and outputs a sensor signal with corresponding information representing the distance to a control device of the adjustment actuator. The control device controlling the operation of the adjustment actuator is then preferably designed to control the adjustment actuator in accordance with the sensor signal. It is thus possible to adjust the climbing device in such a way that a lower end of the climbing device nearest to the contact subsurface and/or the predetermined step tread has a predetermined distance from the contact subsurface or is situated in a predetermined distance region away from the contact subsurface.

The distance sensor is preferably situated fixed in place with respect to the lower end of the climbing device and/or to the predetermined step tread so that a detection signal directly contains information about the vertical distance of the lower end of the climbing device or the predetermined step tread.

One advantage of this approach is that the distance sensor is able to detect the distance from an area of the contact subsurface situated directly below the climbing device. For, due to the distance of the climbing device from the respective drive units of the earth working machine, it is possible that the area of the contact subsurface situated directly below the climbing device may be at a different elevation than the contact subsurface below the drive units, be it due to already performed earth work or due to a local ground formation.

A control device controlling the operation of the adjustment actuator developed separately from the lifting device may also be designed to operate the adjustment actuator in accordance with working state and/or working position information of the lifting device. For this purpose, the lifting device may be equipped with at least one sensor, which detects the working state and/or the working position of the lifting device and outputs a corresponding detection signal to the control device. Additionally, a sensor may be provided, which detects the relative position of the climbing device with respect to the machine frame.

To achieve the ergonomically advantageous most uniform distances between two step treads succeeding one another along the climbing axis, the separate adjustment actuator may have a multi-part telescopic actuator rod extensible and retractable along an actuator axis, which has synchronously extensible and retractable telescopic actuator sub-rods, each telescopic actuator sub-rod being coupled to another step tread for joint movement. The adjustment actuator may be an electric actuator, for example an electrically driven spindle drive. Alternatively, the adjustment actuator may be a hydraulic actuator. Both for electric spindle drive-driven as well as for hydraulically driven telescopic actuator rods, corresponding synchronization control systems for synchronizing the movements of the individual telescopic actuator sub-rods are known in the related art.

Regardless of its concrete structural embodiment, the movement synchronization device may be combined with any kind of adjustment actuator, that is, both with the lifting device used as an adjustment actuator as well as with a separate adjustment actuator, which is provided only for adjusting the climbing device, as well as with an adjustment actuator, which in addition to adjusting the climbing device also performs another additional function than the lifting and lowering of the machine frame.

According to a preferred development of the invention, the upper step tread of the at least three step treads, which are movable relative to one another along the climbing axis, is the uppermost step tread of the climbing device. However, this need not be so. It is also quite possible to provide two step treads that are fixed to the machine, of which one is the uppermost and the other is the second uppermost.

To attain a climbing device that is as long as possible and thus is variable in length over a greatest possible adjustment range, it is preferred according to a preferred development of the invention if the lower step tread of the at least three step treads is the lowermost step tread of the climbing device.

The climbing device preferably comprises more than three step treads. Also preferably, for comfortably overcoming even greater distances of the elevation level of the operator platform from the contact subsurface, the climbing device comprises more than two step treads that are not fixed to the machine frame, which are arranged along the climbing axis so as to be movable both relative to one another as well as relative to the machine frame.

For securing the climbing device in a predetermined position, the climbing device may be lockable in the at least one predetermined position. Preferably, the locking may be implemented by a cam-curve mechanism, a cam being formed on one component from the group composed of the machine frame and a section of the climbing device that is movable relative to the machine frame along the climbing axis and a control curve being formed on the respectively other component. The cam is designed so that when the cam and the control curve approach one another, the cam slides along, or rolls off on, the control curve, lengthwise relative to the control curve. A configuration of cam and control curve is preloaded in a contact preload direction so that a contact of the cam on the control curve is ensured during a relative movement of cam and control curve. When the cam moves along the control curve in sliding or rolling fashion, the preloaded configuration is deflectable counter to the preload effect. The preloaded configuration is preferably preloaded into a neutral position, from which it is deflectable in two opposite directions counter to the preload effect. The control curve has a latching notch into which the cam is able to engage, the cam automatically engaging into the latching notch when reaching a predetermined relative position relative to the control curve due to the preload effect of the preloaded configuration.

The control curve may also be designed in such a way that after the latching notch is reached, and the relative movement in the same direction of movement is continued, a release section of the curve contour, along which the cam slides in the continued relative movement, causes the cam to move out of the latching notch.

The control curve preferably has a return section bypassing the latching notch, on which the cam abuts after leaving the latching notch and upon the reversal of the relative movement between the control curve and the cam, so that following the movement reversal, the climbing device may be returned, without latching in the predetermined position, to its original position prior to latching.

BRIEF DESCRIPTION OF THE DRAWINGS

The present invention will be explained in greater detail below with reference to the enclosed drawings. The figures show.

DETAILED DESCRIPTION

Figure 1:
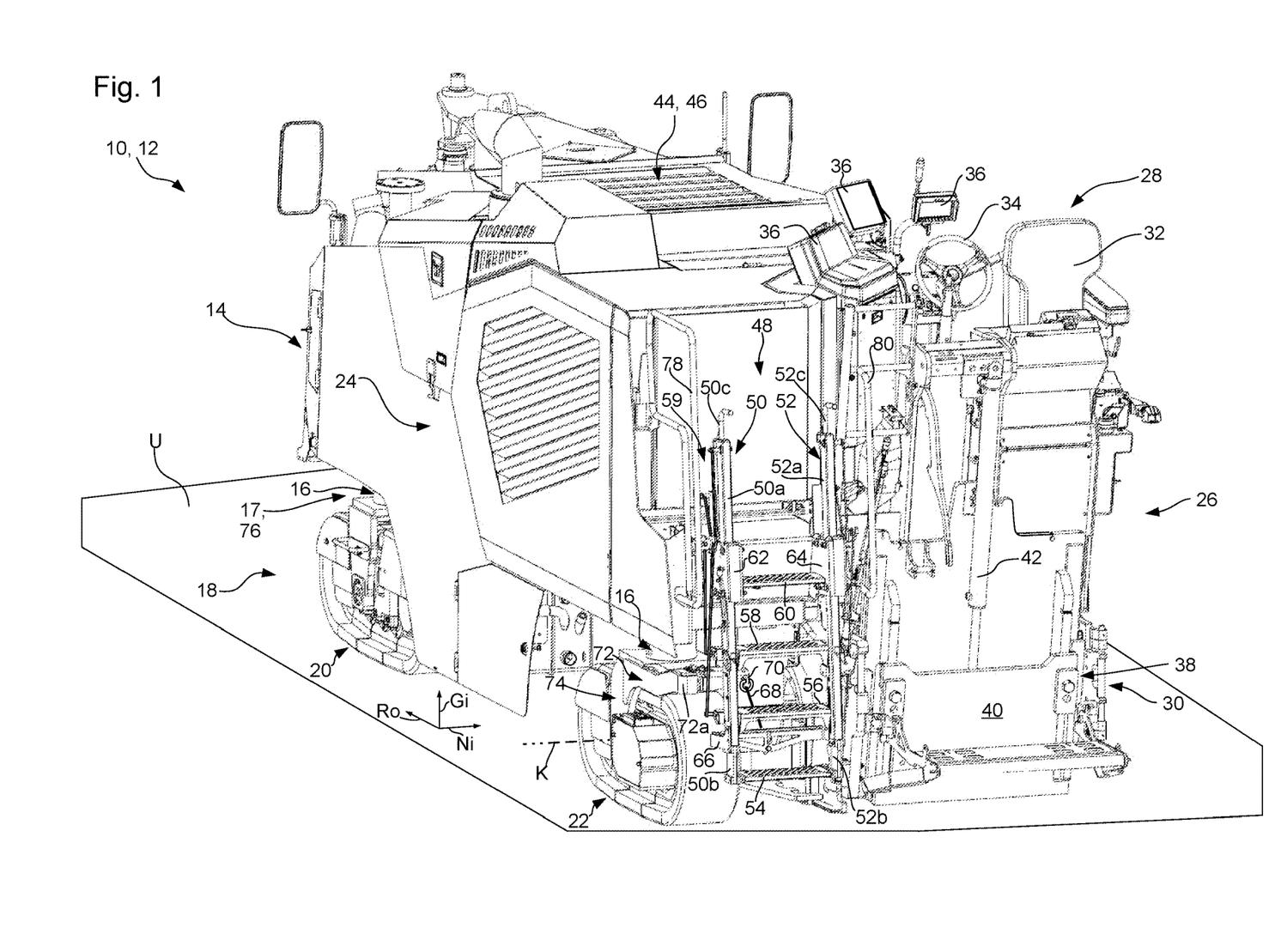
FIG. 1 a schematic perspective view of a specific embodiment according to the invention of a small milling machine obliquely from the rear, FIG. 2 the climbing device of the small milling machine from FIG. 1 with a section of the machine frame of the small milling machine in isolation, FIG. 3 the climbing device from FIG. 2 along the longitudinal direction of the mutually parallel step treads, FIG. 4 the coupling situation of the lowermost step tread of the climbing device of FIGS. 1 through 3 having a drive unit-side coupling component in an operating position, in which the machine frame of the small milling machine is liftable relative to the climbing device, and FIG. 5 the coupling situation from FIG. 4 with a machine frame that is maximally lifted relative to the climbing device.

FIG. 1 shows a specific embodiment of the present invention of a self-propelled earth working machine 10 in the form of a small milling machine 12 in a perspective view obliquely from the rear. Small milling machine 12 comprises a machine frame 14, which is connected by hydraulic lifting columns 16 to a traveling gear 18 in a height-adjustable manner. Of traveling gear 18, FIG. 1 shows a front left crawler track unit 20 and a rear left crawler track unit 22. Front and rear right crawler track units exist as well, but are concealed in FIG. 1 by machine frame 14. The altogether four lifting columns 16, of which due to the chosen perspective only the left two lifting columns are shown, form a lifting device 17. The right rear crawler track unit (not shown) is normally swivable about a swivel axle parallel to the yaw axis between a normal operating position directly next to working apparatus 30 in the vehicle transverse direction and an edge working position in front of the normal operating position and nearer to a vertical machine longitudinal central plane.

FIG. 1 shows small milling machine 12 supported on a level horizontal contact subsurface U. A coordinate trihedral represents a coordinate system of the vehicle including a yaw axis Gi orthogonal to contact subsurface U, which runs parallel to the vertical axis of small milling machine 12, including a pitch axis Ni running in the vehicle transverse direction and including a roll axis Ro running in the vehicle longitudinal direction. The arrowheads on the coordinate trihedral point away from the contact subsurface for yaw axis Gi, in the forward travel direction for roll axis Ro and away from a drive side 24 facing the viewer in FIG. 1 toward an opposite idle side 26 of small milling machine 12.

Small milling machine 12 is controllable from an operator platform 28 that is raised with respect to contact subsurface U. This means that both the movement operation for changing the location of small milling machine 12 on contact subsurface U as well as an earth working operation using a working apparatus 30 situated below operating platform 28 are controllable from operator platform 28. Lifting device 17 is also controllable via operator platform 28. For controlling small milling machine 12, the operator platform has for example a drivers seat 32, a steering wheel 34 and operating panels 36 having input and output means and a control device.

Working apparatus 30 comprises a milling drum, which is accommodated in a milling drum housing 38 so as to be rotatable about a milling axis that is parallel to pitch axis Ni. From the rear one looks onto scraper shield 40 as a rear wall of milling drum housing 38. Relative to machine frame 14, scraper shield 40 is able to be lifted away from contact subsurface U and able to be lowered toward contact subsurface U by a hydraulic piston-cylinder assemblage 42.

In an area located along roll axis Ro in front of operator platform 28, a driving force machine 46 in the form of a diesel internal combustion engine is located below a cover 44, which provides the driving force for a travel movement of small milling machine 12 on contact subsurface U as well as the driving force for working apparatus 30, for lifting device 17 and also for actuators, as provided by piston-cylinder assemblage 42. Each drive unit 20, 22 of traveling gear 18 is hydraulically drivable by a hydraulic motor.

Side 24 of small milling machine 12 is called the "drive side", since on this side the driving force is transmitted by a belt drive and further by a toothed wheel transmission from driving force machine 46 to working apparatus 30. Working apparatus 30 is therefore situated along pitch axis Ni asymmetrically with respect to the transverse center of small milling machine 12 in such a way that it nearly reaches the "idle side" 26 opposite the drive side so that in the preferred exemplary embodiment of small road milling machine 12 a milling edge produced by working apparatus 30 with respect to its pitch axis coordinate approximately coincides with the idle-side lateral wall of milling drum housing 38.

Operator platform 28 may be reached from contact subsurface U via a ladder-like climbing device 48 and vice versa. Climbing device 48 comprises two parallel lateral parts 50 and 52, which in exemplary fashion feature rigid lateral rails 50a and 52a, for example in the form of steel profiles. Three step treads 54, 56, 58 that are movable relative to machine frame 14 are mounted on parallel lateral parts 50 and 52 in such a way that they bridge the distance between lateral parts 50 and 52.

A lowermost step tread 54 is connected to rigid lateral rails 50a and 52a via elastomeric and hence deformable side plates 50b and 52b so that lowermost step tread 54 is able passively to evade within certain limits a collision obstacle lying on contact subsurface U or protruding from the latter. Elastomeric side plates 50b and 52b are deformable by relatively small forces compared to rigid lateral rails 50a and 52a.

The step tread 56 directly above lowermost step tread 54 is movably supported on lateral rails 50a and 52a relative to lowermost step tread 54 along lateral rails 50a and 52a.

Above the second lowermost step tread 56, a next step tread 58 is movably supported on lateral rails 50a and 52a both relative to lowermost step tread 54 as well as relative to second lowermost step tread 56 along lateral rails 50a and 52a.

An uppermost step tread 60 of climbing device 48 is situated in a fixed manner on machine frame 14. Since lateral parts 50 and 52, that is, lateral rails 50a and 52a together with the elastomeric lateral flanges 50b and 52b are supported on machine frame 14 in a translatorily displaceable manner relative to machine frame 14, all step treads 54, 56, 58 movable relative to machine frame 14 are displaceable relative to step tread 60 that is fixed to the machine frame.

The step treads 54, 56 and 58, which are movable relative to machine frame 14, together with the lateral parts 50 and 52 that support them form a step tread assembly 59 that is movable relative to machine frame 14.

On both sides of machine frame-fixated step tread 60 there is in each case a bearing box 62 and 64 fixed to the machine frame, in which lateral parts 50 and 52, respectively, are supported via suitable bearing means, such as for example sliding bearings and/or roller bearings, for the translatory relative movement relative to machine frame 14. Due to the lower friction, the use of roller bearings is preferred.

At the lower longitudinal end of lateral rails 50a and 52a, lateral rails 50a and 52a are rigidly connected to each other by a C-shaped connecting bracket 66. Connecting bracket 66 is made for example from sheet steel and is bolted or preferably welded to lateral rails 50a and 52a.

As will be described more precisely in connection with FIGS. 4 and 5, connecting bracket 66 is connected to a coupling configuration 70 in the form of an eyelet of a drive unit-side coupling component 72 via a non-rigid traction means 68 such as a chain or a rope, for example. The non-rigid traction means 68 may also be referred to as a connector 68 which is configured to only transmit a tension force.

This step tread assembly 59 of climbing device 48, which is movable relative to machine frame 14, is essentially loaded only by the force of its weight and is held in place by traction means 68. The force of the weight of the movable part of climbing device 48 thus tautens traction means 68.

The part 72a of drive unit-side coupling component 72, which is fixed to the drive unit, is fixedly connected to a drive unit console 74, which embraces the left rear drive unit 22 in a fork-like manner, for example by welding. Drive unit console 74 connects lifting column 16 to left rear drive unit 22 in such a way that drive unit 22 is tiltable relative to lifting column 16 about a tilting axis K running parallel to pitch axis Ni in FIG. 1. A part 72b (see FIGS. 4 and 5) supporting coupling configuration 70 is swivable in FIG. 1 about a swivel axis P parallel to roll axis Ro relative to part 72a of drive unit-side coupling component 72 that is fixed to the drive unit.

Lateral parts 50 and 52 together with the step treads 54, 56 and 58 that connect them may be manually lifted and lowered from operator platform 28 via handles 50c and 52c at the upper longitudinal end of lateral rails 50a and 52a.

Due to the movement guidance of lateral parts 50 and 52 in bearing boxes 62 and 64 and further due to the connection of lateral parts 50 and 52 and thus of lowermost step tread 54 to coupling configuration 70 and consequently to drive unit-side coupling component 72, the relative vertical position of lateral parts 50 and 52 is changed relative to machine frame 14 by lifting device 17, especially by the two rear lifting columns 18, so that lifting device 17 forms an adjustment actuator 76 of climbing device 48.

Handrails 78 and 80 on both sides of climbing device 48 offer an ascending or descending person a grip and thus a secure support during a climbing movement on climbing device 48.

The operating situation of the small milling machine 12 shown in FIG. 1 is a position of machine frame 14 that is maximally lowered toward contact subsurface U. The individual distances prevalent between step treads 54, 56, 58 and 60 are approximately of equal size and are minimal in the operating situation shown in FIG. 1.

Figure 2:
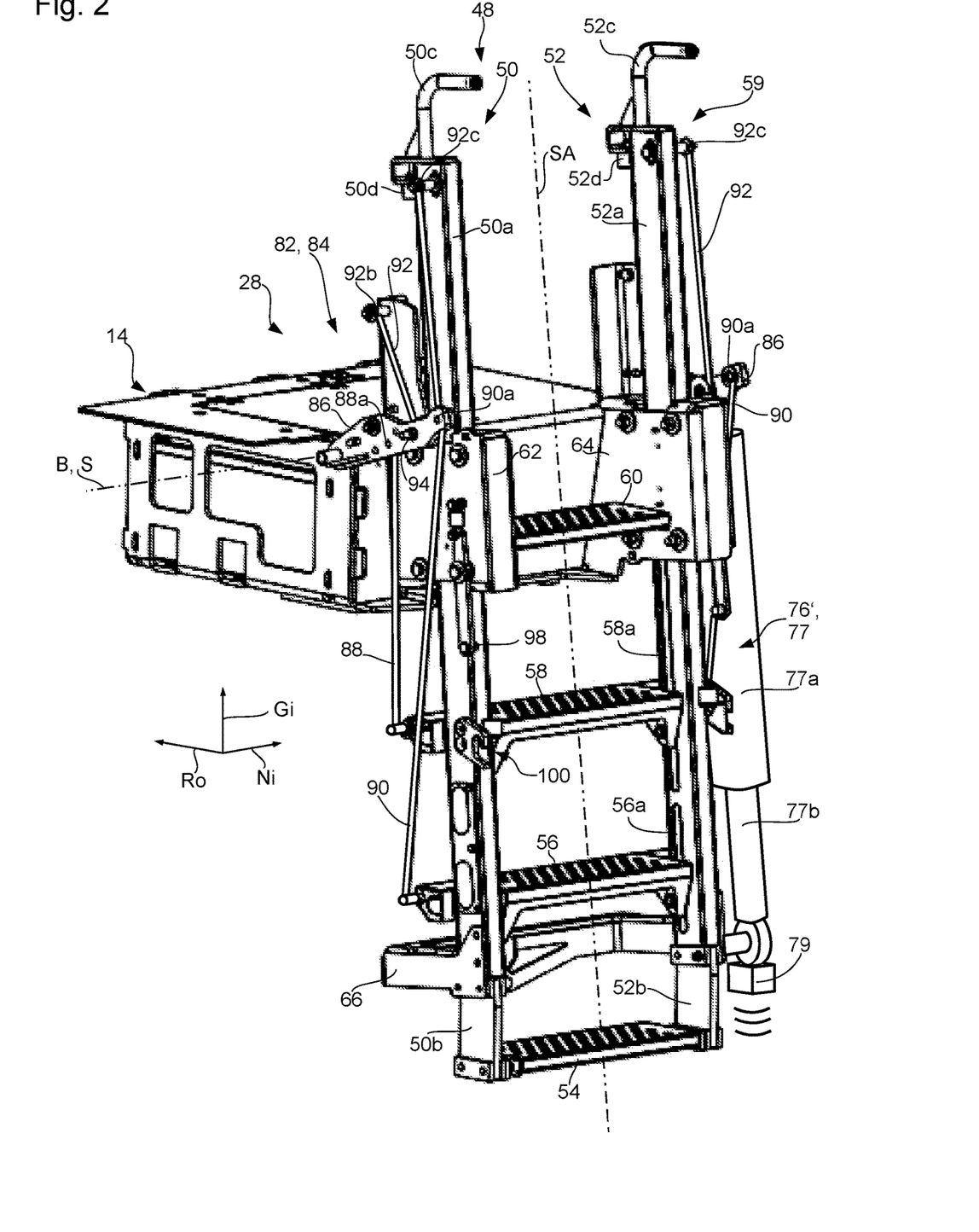

FIG. 2 shows the climbing area of small milling machine 12 in isolation, i.e., without the surrounding rest of the earth working machine 10. A section of machine frame 14 represents the elevation level at which operator platform 28 is located.

In addition to the components and component assemblages already labeled in FIG. 1, the clearer FIG. 2 shows the climbing axis SA, along which step treads 54, 56, 58 and 60 succeed one another away from contact subsurface U and along which step treads 54, 56 and 58 or step tread assembly 59 are movably arranged relative to machine frame 14. Climbing axis SA runs parallel to the likewise parallel virtual longitudinal axes of lateral rails 50 and 52.

An oblong hole may be seen on lateral rail 52, in which step tread 58 is movably guided on lateral rail 52 relative to the remaining step treads 54, 56 and 60 along climbing axis SA. Analogously, the step tread 56 located underneath is movably guided on lateral rail 52 in a collinear oblong hole along climbing axis SA relative to each of the remaining step treads 54, 58 and 60. On the side facing away from the viewer of FIG. 2, lateral rail 50 has corresponding oblong holes in which step treads 58 and 56 are movably guided with their longitudinal end nearer to lateral rail 50.

A movement synchronization mechanism 82 will be explained below with reference to FIGS. 2 and 3, which transmits a relative movement, driven by lifting device 17, of machine frame 14 relative to traveling gear 18, in particular relative to the left rear drive unit 22 coupled to connecting bracket 66 and thus to the lowermost step tread 54, into a movement of step treads 54, 56, 58 and 60 relative to one another in such a way that the distances directly succeeding one another along climbing axis SA between all step treads directly adjacent along climbing axis SA are essentially of equal magnitude across the entire lifting movement range of machine frame 14.

Movement synchronization mechanism 82 comprises a transmission assemblage 84 in the form of a swivel lever 86. This swivel lever 86 is swivable about a swivel axle S as an axis of motion B relative to machine frame 14.

On swivel lever 86, step tread 58 is linked by a rope 88 on a linkage point 88a nearest to swivel axle S. At a linkage point 90a, a rope 90 is linked on swivel lever 86, which couples step tread 56 to swivel lever 86. The distance of linkage point 90a from linkage point 88a is identical to the distance of linkage point 88a from swivel axle S.

In the present case, the lowermost step tread 54 is connected via traction means 68 directly to lifting device 17 as the adjustment actuator 76 of climbing device 48. The lowermost step tread 54 is therefore the lead step tread, from the relative movement of which relative to machine frame 14 the movement of the remaining step treads 56 and 58 movable relative to machine frame 14 is derived via transmission assemblage 84. Lead step tread 54 is coupled via a rope 92 to swivel lever 86, rope 92—in contrast to ropes 88 and 90—not being fixedly coupled to swivel lever 86, but rather via a deflection pulley 94. Linkage point 92a of deflection pulley 94 on swivel lever 86 determines the lever arm of lead step tread 54. Rope end 92b of rope 92 is fixed to the machine frame, while the opposite rope end 92c is fixedly connected to lateral part 50 and thus to lead step tread 54. Due to the deflection of rope 92 on deflection pulley 94, a displacement of lead step tread 54 along climbing axis SA is transmitted to swivel lever 86 only at half the magnitude of the displacement. The resulting swivel movement of swivel lever 86 corresponds to the same swivel movement, which, at the same displacement of lead step tread 54, a rope 92 linked without deflection pulley directly to swivel lever 86 at alternative linkage point 92a' would effect. The alternative linkage point 92a' is at the same distance from the preceding linkage point 90a as linkage point 90a from preceding linkage point 88a.

The use of deflection pulley 94 thus allows swivel lever 86 to be shortened at the same movement transmission. Effectively, under identical linkage conditions, the linkage point of lead step tread 54 is furthest removed from swivel axle S. With increasing distance of a step tread from lead step tread 54, the linkage point of the step tread at swivel lever 86 draws nearer to its swivel axle S. As a result, the relative movement of lead step tread 54, which is coupled directly to adjustment actuator 76, relative to machine frame 14 is transmitted by swivel lever 86 to the remaining step treads 56 and 58 movable relative to machine frame 14 in a manner that is reduced by a transmission ratio determined by the distance of the linkage points from swivel axle S, that is, the further the step tread is removed from lead step tread 54, the greater is the reduction.

Since lifting device 17 as adjustment actuator 76 is able to change the vertical distance between machine frame 14 and traveling gear 16 in stepless fashion, the distance between the uppermost machine frame-fixated step tread 60 and the lowermost lead step tread 54 is also steplessly changeable. In every operating situation of lifting device 17, every step tread 56, 58 and 60 is situated at the same distance from the nearest adjacent step tread in the direction toward contact subsurface U.

As an alternative adjustment actuator 76', FIG. 2 shows a hydraulically operable piston-cylinder assemblage 77 developed separately from lifting device 17. This adjustment actuator 76' is able to adjust climbing device 48 or step tread assembly 59, which is movably disposed relative to machine frame 14, along climbing axis SA, if lifting device 17 is not used as adjustment actuator 76.

At the longitudinal end, facing contact subsurface U, of the piston rod 77b, which is extensible out of a cylinder 77a fixed to the machine frame and is retractable into cylinder 77a, a distance sensor 79 is situated, which detects the distance between itself and contact subsurface U and transmits it to a control device 36 controlling adjustment actuator 76'. The control device 36 may also be referred to as a controller 36. Piston rod 77b is coupled to connecting bracket 66 in a fixed manner with respect to the vertical coordinate in the yaw axis direction and thus to lateral parts 50 and 52 and consequently to lowermost step tread 54. The distance information provided by distance sensor 79 is therefore distance information about the vertical distance of step tread 54 from contact subsurface U. Control device 36 is designed by programming to control adjustment actuator 76' in accordance with the signals of distance sensor 79 is such a way that lowermost step tread 54 is at a predetermined distance from the area of the contact subsurface detected by the distance sensor or is located within a predetermined distance range from the detected area. The distance sensor in the depicted exemplary embodiment detects the contact subsurface U preferably in an area, in which the virtual climbing axis penetrates it. A person would be located at this location immediately before or after using the climbing axis.

Distance sensor 79 is represented as being situated on piston rod 77a only by way of example. Alternatively, sensor 79 may be situated for example on one of the two lateral rails 50a or 50b, on connecting bracket 66 or on lowermost step tread 54.

Figure 3:
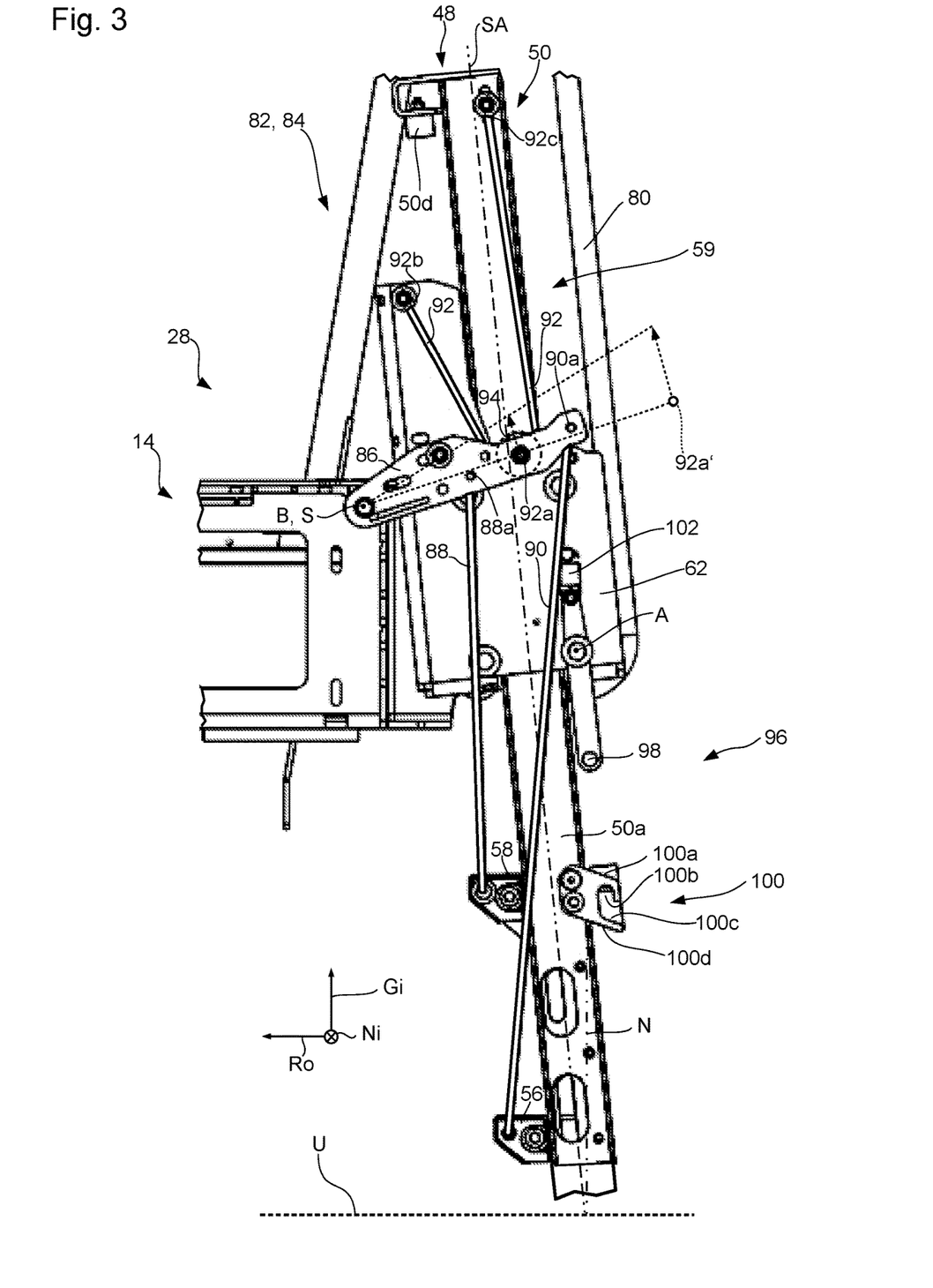

FIG. 3 indicates contact subsurface U in its orientation relative to the climbing axis. The contact subsurface extends orthogonally with respect to the drawing plane of FIG. 3, but is actually further removed from step tread 56 than is illustrated in FIG. 3. It may be seen that for reasons of improved ergonomics climbing axis SA is preferably inclined by approximately 6° with respect to a normal N on contact subsurface U, namely, due to the disposition of climbing device 48 at the rear of small milling machine 12, along roll axis Ro in the forward direction of travel. The inclination is such that the step treads approach the machine frame in the direction away from contact subsurface U. The mutually parallel step treads 54, 56, 58 and 60 extend orthogonally with respect to roll axis Ro.

Instead of the mentioned ropes, it is also possible to use other traction means on transmission assemblage 84, for example chains or belts. Instead of the non-deflected ropes 88 and 90, it is also possible to use rods for transmitting the movement between swivel lever 86 and step treads 56 and 88. If the alternative linkage point 92a' is used for connecting swivel lever 86 to lead step tread 54, then this connection may also be established by a rod.

FIG. 3 further shows a locking mechanism 96, by which climbing device 48, in particular step tread assembly 59, may be locked in a lifted operating position, in which step tread 54 and thus also step treads 56 and 58 are brought as close as possible to machine frame 14. This allows for the rear end of small milling machine 12 to approach an obstacle as closely as possible during earth work, without risk of damage to climbing device 48.

Locking mechanism 96 comprises a cam 98, deflectable in opposite deflection directions about a deflection axle A that is parallel to pitch axis Ni, and a control curve 100 interacting with cam 98. Deflection axle A is fixed to the machine frame. Control curve 100 is fastened to lateral part 50, in particular to lateral rail 50a for joint movement with the latter.

When control curve 100 approaches cam 98 along climbing axis SA, cam 98 meets a front side 100a of control curve 100, which is inclined relative to climbing axis SA, so that front side 100a deflects cam 98 due to its inclination toward a latching contour 100b. Cam 98 is preloaded by a spring 102 into the position shown in FIG. 1, to which it returns by the spring preload without external influence following a deflection.

With the continued approach of control curve 100 to operator platform 28, cam 98 moves along the, in FIG. 3, right portion of control curve 100 having the latching contour and finally comes into a form-locking engagement with latching contour 100b due to its spring preload.

By a further approach of control curve 100 to operator platform 28, this form-locking engagement between cam 98 and catch contour 100b can be released again, since due to the further approach cam 98 meets a release section 100c of control curve 100, which is inclined in the same sense as the front side 100a of control curve 100 relative to climbing axis SA. Hence, with the continued approach of control curve 100 to operator platform 28, cam 98 is moved by release section 100c against its spring preload out of latching contour 100b and finally engages behind the entire control curve 100. A further approach of control curve 100 to operator platform 28 would then result in control curve 100 being lifted off cam 98.

If in this situation the movement of control curve 100 and thus of climbing device 48 is reversed, that is, if control curve 100 is lowered in the direction toward cam 98, cam 98 comes into contact with a return section 100d, which is again inclined relative to climbing axis SA, which in a continued lowering movement of control curve 100 this time deflects cam 98 to the, in FIG. 3, left side of control curve 100, where it is able to return into the position shown in FIG. 3 without form-locking engagement with latching contour 100b.

Climbing device 48 is preferably designed in mirror image with respect to a plane of symmetry containing climbing axis SA and running parallel to roll axis Ro. The components and component assemblages described above on lateral part 50 including transmission assemblage 84 preferably also exist on lateral part 52, while taking the mentioned symmetry condition into account.

End stops 50d and 52d visible on lateral parts 50 and 52 in FIG. 2, which may be formed by rubber bumpers, define a final position of lateral parts 50 and 52 and thus of climbing device 48 relative to machine frame 14.

When machine frame 14 in a lifting movement reaches end stops 50d and 52d, this terminates a relative movement between machine frame 14 and climbing device 48 so that climbing device 48 or step tread assembly 59, which are then resting with end stops 50d and 52d on machine frame 14, is then lifted further jointly with machine frame 14. An excessively great distance of step treads 54, 56, 58 and 60 from one another is thereby avoided, but at the price of an increased distance of the lowermost step tread 54 from contact subsurface U.

In order to allow for machine frame 14 to pull along lateral parts 50 and 52 and thus step treads 54, 56 and 58 and in order to allow for the described manual stop of climbing device 48 on machine frame 14 upon lifting lateral parts 50 and 52 from operator platform 28, connecting bracket 66 is coupled by traction means 68 to coupling configuration 70 with a clearance of motion.

Figure 4:
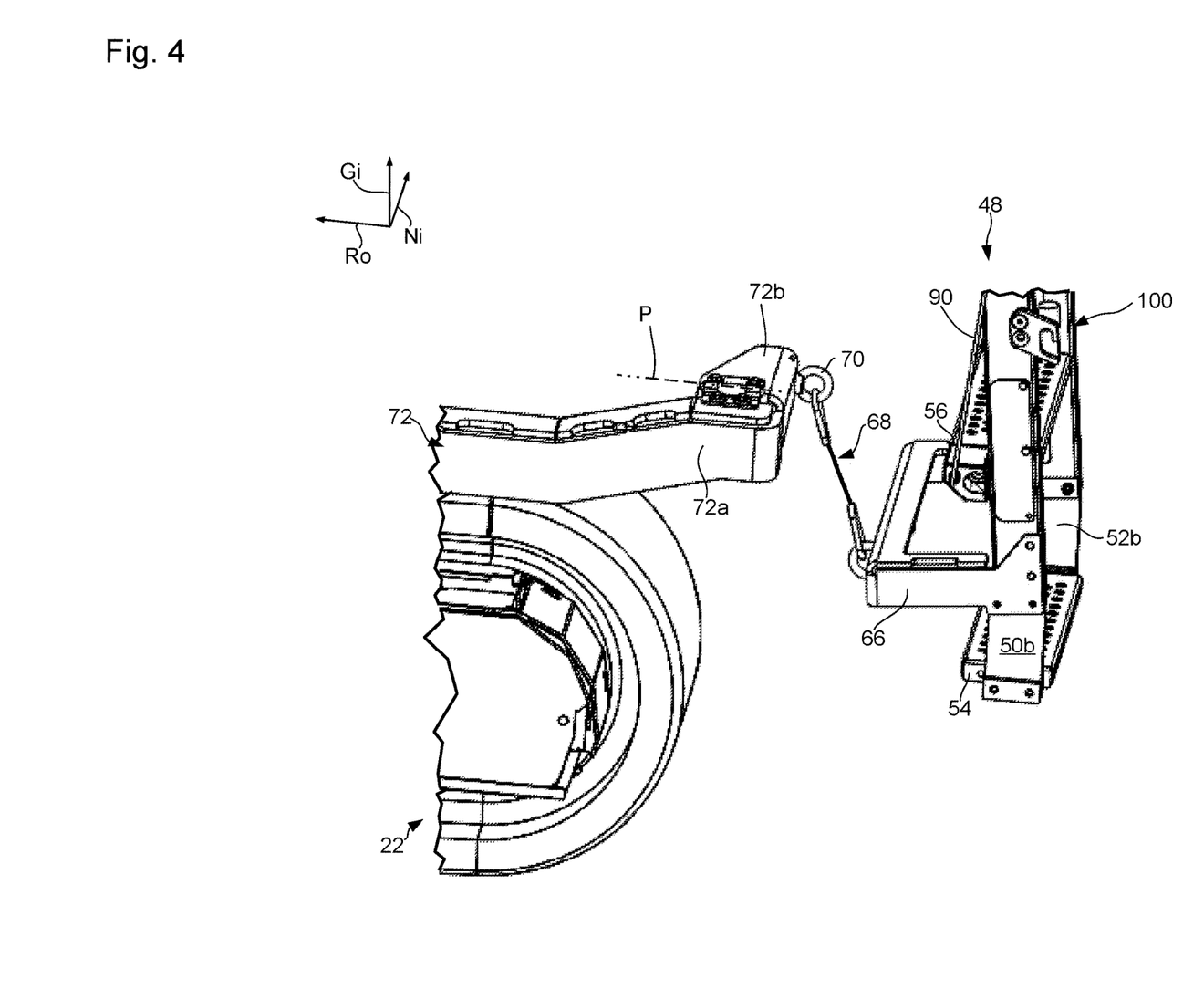
Figure 5:
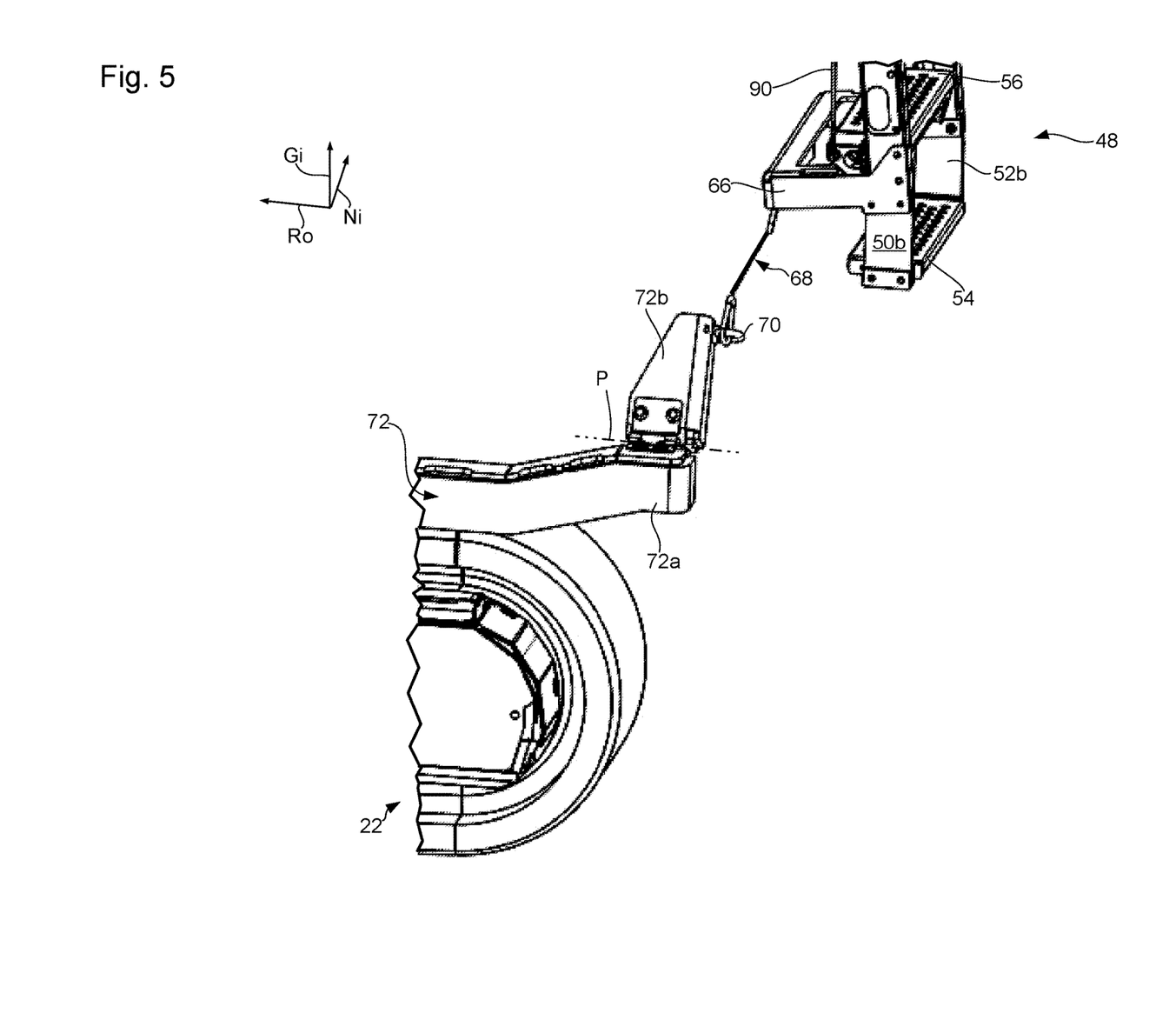

FIG. 4 shows an operating position of climbing device 48, which is representative for any operating position, in which end stops 50d and 52d do not abut against machine frame 14 and in which therefore a movement of machine frame 14 relative to climbing device 48, in particular relative to lateral parts 50 and 52, is possible. The part of climbing device 48 that is movable relative to machine frame 14, that is, step tread assembly 59, rests with its weight via traction means 68 on coupling configuration 70, whereby traction means 68 is tautened. Traction means 68 must therefore be designed in such a way that it bears the weight of climbing device 48 and additionally the maximum weight of a person using climbing device 48.

Using a traction means 68 that bears load only when pulled, such as a chain, rope or belt for example, ensures that climbing device 48 has a clearance of motion along climbing axis SA in spite of climbing device 48 being coupled to drive unit-side coupling component 72. This clearance of motion may be increased further in that part 72b bearing coupling configuration 70 is able to be folded away from contact subsurface U about swivel axis P relative to part 72a of drive unit-side coupling component 72, which is fixed to the drive unit. FIG. 5 shows a maximally lifted operating position of climbing device 48 or of step tread assembly 59 relative to rear drive unit 22.

The foldability of coupling configuration 70 increases the travel distance of climbing device 48 along climbing axis SA in spite of being coupled to drive unit-side coupling component 72. Thus, in contrast to the case where coupling configuration 70 is not foldable, it is possible to remove climbing device 48 further from contact subsurface U even when end stops 50d and 52d abut against machine frame 14 and a lifting movement of machine frame 14 is only possible jointly with climbing device 48. Altogether, a greater adjustment range of climbing device 48 relative to contact subsurface U is thus achieved.

The invention claimed is:

1. A self-propelled earth working machine, comprising:
a machine frame;
a traveling gear supporting the machine frame from a contact subsurface, the traveling gear including at least two drive units rollable on the contact subsurface;
a working apparatus supported from the machine frame and configured to modify the contact subsurface;
a drive force machine configured to provide driving force for the earth working machine;
an operator platform supported on the machine frame at an elevation level above the contact subsurface for operating the earth working machine; and
a climbing device situated between the contact subsurface and the operator platform, the climbing device including:
a plurality of step treads situated in succession along a virtual climbing axis extending between the contact subsurface and the elevation level of the operator platform;
at least one of the step treads being adjustable in position relative to at least one other of the step treads with the aid of an adjustment actuator, such that the climbing device is variable in length along the climbing axis; and
wherein the climbing device is adjustable into at least three different operating positions, the climbing device being climb-ready for a climbing movement of a machine operator between the operator platform and the contact subsurface in each of the at least three different operating positions, each step tread pair formed by two of the at least three step treads situated in succession along the climbing axis being separated by a distance between step treads, the distance between step treads of each step tread pair being of a different magnitude in different operating positions.

2. The self-propelled earth working machine of claim 1, wherein:
the climbing device is adjustable steplessly within an adjustment range into a plurality of different climb-ready operating positions, the plurality of different climb-ready operating positions including the at least three different operating positions.

3. The self-propelled earth working machine of claim 1, further comprising:
a lifting device connecting the machine frame to the traveling gear such that a height of the machine frame relative to the traveling gear is adjustable by the lifting device.

4. The self-propelled earth working machine of claim 1, wherein:
the adjustment actuator is configured to be operated in automated fashion relative to the contact subsurface such that a predetermined one of the plurality of step treads movable relative to the machine frame is situated in a predetermined spatial region relative to the machine frame and/or relative to the contact subsurface.

5. The self-propelled earth working machine of claim 1, wherein:
an upper step tread of the at least three step treads further removed from the contact subsurface is fixed relative to the machine frame.

6. The self-propelled earth working machine of claim 1, wherein:
one of the drive units includes a drive unit-side coupling component configured for joint vertical displacement with the one of the drive units relative to the machine frame; and
a lower step tread of the at least three step treads situated closer to the contact subsurface is coupled to the drive unit-side coupling component by a connector.

7. The self-propelled earth working machine of claim 6, wherein:
the connector is configured to couple the lower step tread to the drive unit-side coupling component with a clearance of motion with a degree of freedom of motion along the climbing axis.

8. The self-propelled earth working machine of claim 6, wherein:
the connector is configured to transmit only a tension force between the lower step tread and the drive unit-side coupling component.

9. The self-propelled earth working machine of claim 8, wherein:
the connector is selected from the group consisting of a chain, a rope and a belt.

10. The self-propelled earth working machine of claim 6, wherein:
the drive unit-side coupling component includes a coupling configuration to which the connector is connected, the coupling configuration being movable relative to the one of the drive units with a movement component along the climbing axis.

11. The self-propelled earth working machine of claim 1, further comprising:
a lifting device connecting the machine frame to the traveling gear such that a height of the machine frame relative to the traveling gear is adjustable by the lifting device; and
wherein the climbing device is connected to the lifting device such that the lifting device is configured as the adjustment actuator to vary the length of the climbing device.

12. The self-propelled earth working machine of claim 1, wherein:
the climbing device further includes a movement synchronization mechanism kinematically coupling the at least three step treads to each other such that in a plurality of different operating states a distance between a first two step treads succeeding one another along the climbing axis and a distance between a second two step treads succeeding one another along the climbing axis do not differ from each other by more than 10% relative to a greatest one of the distances.

13. The self-propelled earth working machine of claim 12, wherein:
the distances do not differ from each other by more than 5% relative to the greatest one of the distances.

14. The self-propelled earth working machine of claim 12, wherein:
at least some of the step treads are movable step treads movable relative to the machine frame along the climbing axis;
the movement synchronization mechanism includes a transmission assemblage movable relative to the machine frame about an axis of motion orthogonal to the climbing axis, the transmission assemblage being connected to the movable step treads in movement-transmitting fashion such that a movement of the transmission assemblage correlates with an adjustment movement of the movable step treads along the climbing axis; and
a movement of the adjustment actuator is transmittable to the transmission assemblage and the movement of the adjustment actuator is transmittable from the transmission assemblage at a respectively different transmission ratio to each one of the movable step treads.

15. The self-propelled earth working machine of claim 14, wherein the transmission assemblage includes:
a swivel lever swivable about the axis of motion; and
a plurality of links, each of the links linking a respective one of the movable step treads to the swivel lever, each of the links being connected to the swivel lever at a respective linkage location, the transmission ratio for the movable step connected to each link being determined by a distance between respective linkage location and the axis of motion.

16. The self-propelled earth working machine of claim 14, wherein the transmission assemblage includes:
a plurality of jointly rotating rotation bodies of different diameters; and
each of the movable step treads being coupled to a respective engagement circumference of a respective one of the rotation bodies for joint movement with the rotation body, the transmission ratio for each of the movable step treads being determined by a diameter of the respective engagement circumference.

17. The self-propelled earth working machine of claim 1, further comprising:
a lifting device connecting the machine frame to the drive units such that a height of the machine frame relative to the drive units is adjustable by the lifting device; and
wherein the adjustment actuator is separate from the lifting device.

18. The self-propelled earth working machine of claim 17, wherein:
the adjustment actuator is configured to be operated in automated fashion such that a predetermined one of the plurality of step treads movable relative to the machine frame is situated in a predetermined spatial region relative to the machine frame and/or relative to the contact subsurface; and
further comprising a controller configured to control operation of the adjustment actuator to operate the adjustment actuator in accordance with a working position of the lifting device.

19. The self-propelled earth working machine of claim 17, wherein:
the adjustment actuator includes a multi-part telescopic actuator rod extensible and retractable along an actuator axis, the multi-part telescopic actuator rod including synchronously extensible and retractable telescopic actuator sub-rods.

20. The self-propelled earth working machine of claim 1, further comprising:
  a lock configured to lock the climbing device in at least one predetermined position.

\* \* \* \* \*